C. R. Macy,
Harrow.
No. 98,281. Patented Dec. 28, 1869.
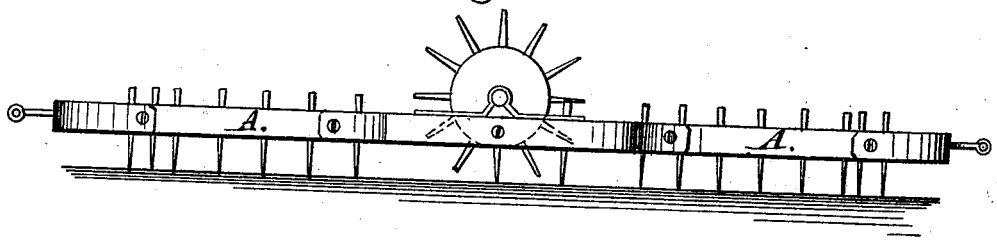
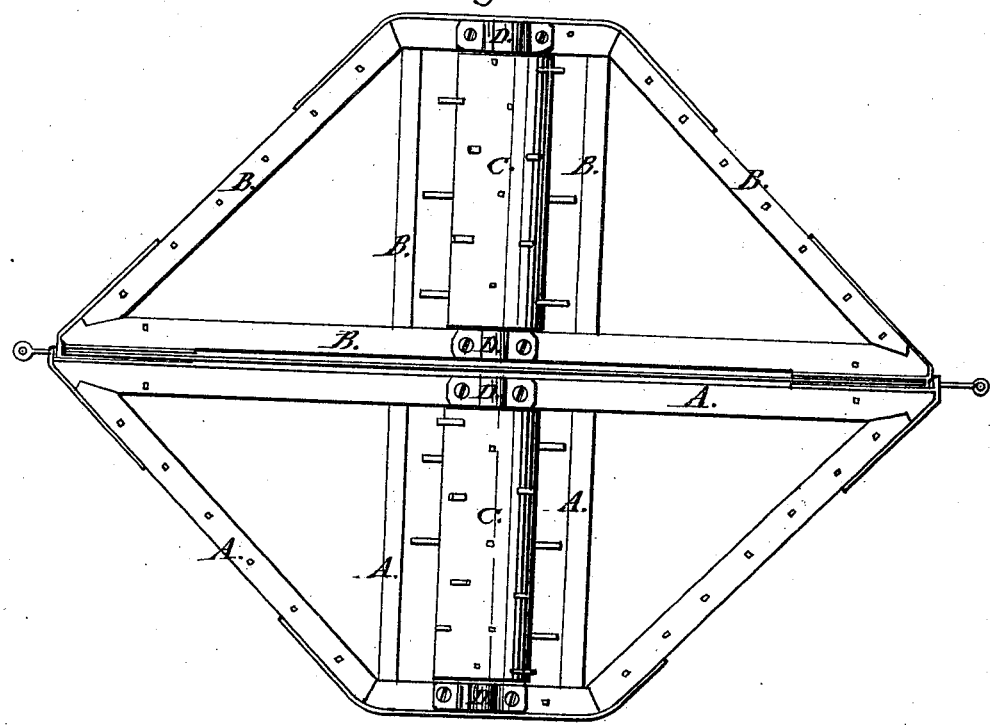
Witnesses:
M. Vorlander
Mo. F. Brooks
Inventor:
C. R. Macy
Per Munn & Co.
Attorney

United States Patent Office.

C. R. MACY, OF BEDMINSTER, NEW JERSEY.

Letters Patent No. 98,281, dated December 28, 1869.

IMPROVEMENT IN HARROWS.

The Schedule referred to in these Letters Patent and making part of the same.

*To all whom it may concern:*

Be it known that I, C. R. MACY, of Bedminster, in the county of Somerset, and State of New Jersey, have invented a new and useful Improvement in Harrows; and I do hereby declare that the following is a full, clear, and exact description thereof, which will enable others skilled in the art to make and use the same, reference being had to the accompanying drawings, forming part of this specification, in which—

Figure 1 is a side view of my improved harrow.

Figure 2 is a top view of the same.

Similar letters of reference indicate corresponding parts.

My invention has for its object, improvement in that class of harrows which is provided with toothed cylinders; and It consists in the construction and arrangement of parts as hereinafter described.

A and B represent the triangular parts of an ordinary harrow, which are hinged to each other by an iron rod as shown.

C are cylinders, which may be made of wood or iron, and may be made hollow or solid, as may be desired. The cylinders C are provided with teeth projecting radially from their outer suface.

The journals of the cylinder C revolve in bearings D, attached to the frames A and B.

The bearings D may be made adjustable, so that they may be raised or lowered to adjust the toothed cylinders C, as the operator may desire.

By this construction, as the harrow is drawn forward, the teeth of the front part of the harrow will break up and tear asunder the larger clods and pieces of sod, and the toothed cylinders C will crush and further break up the clods, lumps, &c., and scatter their fragments over the soft soil, with which they will be more thoroughly intermingled by the teeth of the rear part of the harrow, a single machine thus taking the place and doing the work of three machines, viz, a harrow, roller, and clod-crusher.

Having thus described my invention,

I claim as new, and desire to secure by Letters Patent—

The improved harrow, composed of the parts A and B of the form shown, hinged together and provided with teeth in front and rear of the toothed cylinders C C, which are in alignment when the harrow is open, all constructed and operating as shown and described for the purpose specified.

C. R. MACY.

Witnesses:
 JOHN S. SKILLMAN,
 W. W. BLAUVELT.